(12) United States Patent
Frankel et al.

(10) Patent No.: US 12,515,970 B2
(45) Date of Patent: Jan. 6, 2026

(54) TUBE DIFFUSER AND ASSOCIATED SADDLE

(71) Applicant: SSI Aeration, Inc., Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US)

(73) Assignee: SSI Aeration, Inc., Poughkeepsie, NY (US)

( * ) Notice: Subject to any disclaimer, the term of this patent is extended or adjusted under 35 U.S.C. 154(b) by 528 days.

(21) Appl. No.: 18/163,702

(22) Filed: Feb. 2, 2023

(65) Prior Publication Data

US 2023/0322598 A1   Oct. 12, 2023

Related U.S. Application Data

(60) Provisional application No. 63/362,857, filed on Apr. 12, 2022.

(51) Int. Cl.
*B01F 23/23*  (2022.01)
*B01F 23/231*  (2022.01)
*C02F 3/20*  (2023.01)
*B01F 101/00*  (2022.01)

(52) U.S. Cl.
CPC ...... *C02F 3/201* (2013.01); *B01F 23/231143* (2022.01); *B01F 23/23123* (2022.01); *B01F 23/231241* (2022.01); *B01F 23/231244* (2022.01); *B01F 23/231265* (2022.01); *B01F 2101/305* (2022.01)

(58) Field of Classification Search
CPC ................. B01F 23/23; B01F 23/2312; B01F 23/231241; B01F 23/231265
See application file for complete search history.

(56) References Cited

U.S. PATENT DOCUMENTS 6,702,263 B2 *   3/2004   Kelly ............... B01F 23/23124
                                                    277/504

* cited by examiner

*Primary Examiner* — Robert A Hopkins
(74) *Attorney, Agent, or Firm* — Kevin E. West; Advent, LLP (57) ABSTRACT

Aspects of the invention describe a tube diffuser design and associated saddle design that allow the two elements to be easily and quickly attached to each other in the field for the purpose of aerating wastewater. The tube diffuser is cylindrical and includes a gas distribution section spanning across an interior diameter of the tube diffuser. The saddle includes a pair of engagement arms that are able to couple to this gas distribution section of the tube diffuser. Once the tube diffuser is attached to the saddle and the assembly is submerged in wastewater, the saddle may be used to transport air from an air distribution pipe to the tube diffuser. The air may then be made to leave the tube diffuser as a plume of air bubbles.

15 Claims, 6 Drawing Sheets

TUBE DIFFUSER AND ASSOCIATED SADDLE

FIELD OF THE INVENTION

The present invention relates generally to apparatus for wastewater treatment, and, more particularly, to tube diffusers and associated saddles for use in wastewater treatment.

BACKGROUND OF THE INVENTION

Tube diffusers are conventionally used to support aerobic biological processes in wastewater treatment plants. A tube diffuser typically comprises a cylindrical flexible diffuser membrane that covers a rigid tubular body. Supplying pressurized air to the tube diffuser while the tube diffuser is immersed in wastewater has the effect of expanding the flexible diffuser membrane away from the rigid tubular body and causing the air to escape into the wastewater through a multiplicity of perforations in the flexible diffuser membrane. The effect is a plume of small bubbles that act to both oxygenate the biological processes occurring in the wastewater treatment tank and to provide a mixing function.

A convenient means of attaching a tube diffuser to a gas distribution pipe in a wastewater treatment tank is via what is commonly called a "saddle" or "saddle-type connector." Typically, a saddle attaches to a gas distribution pipe while tapping into the pipe and distributing gas therefrom to two tube diffusers located on opposite sides of the saddle. So arranged, the two tube diffusers are oriented transverse to the gas distribution pipe. A given wastewater treatment tank may include many tens of such tube diffusers.

Despite the availability of these tube diffusers and their associated saddles, it still takes significant labor to assemble these devices in the field. Many currently-available tube diffuser and saddle designs also do not lend themselves to efficient packaging and transport, an issue that has recently become more pressing due to excessive containerized shipping costs. For the foregoing reasons, there is a need for new tube diffuser and saddle designs that address these various shortcomings.

SUMMARY OF THE INVENTION

Embodiments of the present invention address the above-identified needs by providing tube diffusers and associated saddles that address the above-identified deficiencies.

In accordance with aspects of the invention, an apparatus comprises a tube diffuser. The tube diffuser comprises a diffuser body and a diffuser membrane. The diffuser body is externally cylindrical, is centered about a longitudinal axis, and includes: a curved internal sidewall; a gas distribution section spanning across an interior diameter of the diffuser body at a proximal end thereof and defining two oppositely-facing external sidewalls; and two open spaces, each of the two open spaces disposed between a respective one of the two oppositely-facing external sidewalls and the curved internal sidewall. The diffuser membrane covers a portion of the diffuser body and defines a plurality of membrane holes.

In accordance with additional aspects of the invention, the above-described tube diffuser is attached to a saddle comprising a pair of engagement arms. Each of the pair of engagement arms occupy a respective one of the two open spaces in the tube diffuser and abut a respective one of the two oppositely-facing external sidewalls of the gas distribution section of the tube diffuser.

In accordance with even additional aspects of the invention, the above-described tube diffuser and saddle are combined with an air distribution pipe. The saddle is attached to the air distribution pipe and is operative to transfer air from the air distribution pipe to the tube diffuser.

Advantageously, embodiments in accordance with aspects of the invention provide aeration equipment, which may be quickly and easily set up in the field at wastewater treatment facilities with both reduced labor and reduced chances of leaks and other defects. This aeration equipment may also be shipped in a very compact form so as to reduce shipping costs.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Embodiments of the invention may include tube diffusers and associated saddles for use in wastewater treatment. A saddle attaches to an air distribution pipe at or near the bottom of a wastewater treatment tank. Two tube diffusers attach to the saddle so as to be oriented transverse to the air distribution pipe. When so arranged, the saddle is operative to transfer air from the air distribution pipe to the two tube diffusers to cause the two tube diffusers to produce plumes of air bubbles. The bubbles act to both oxygenate the biological processes occurring in the wastewater and to provide a mixing function.

Figure 1:
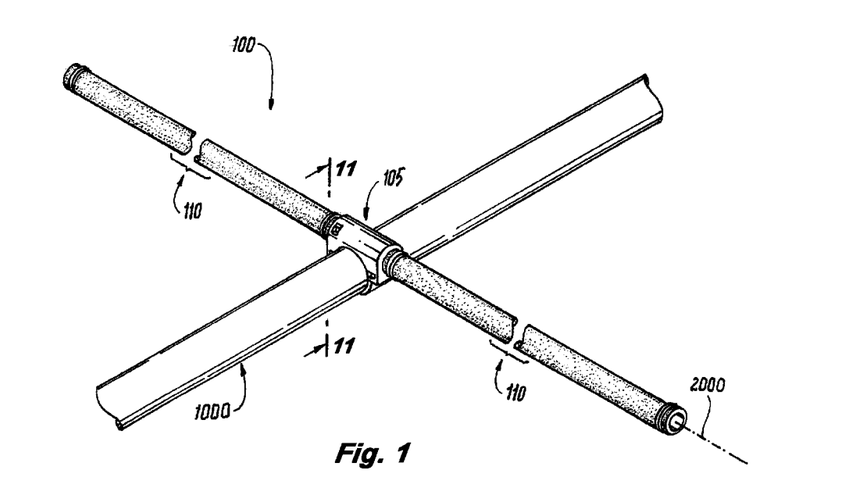
FIG. 1 shows a perspective view of an aeration assembly in accordance with an illustrative embodiment of the invention in association with an air distribution pipe.
Figure 2:
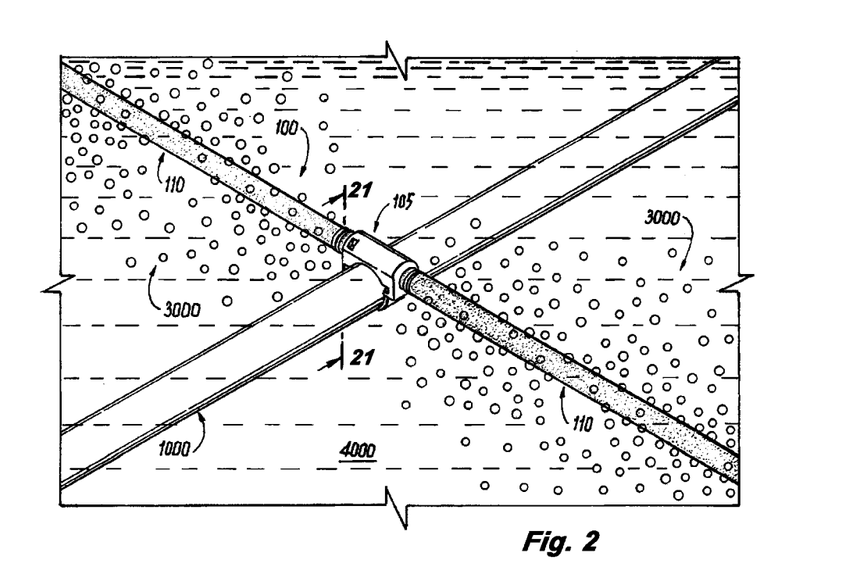
FIG. 2 shows a perspective view of the FIG. 1 elements functioning to create air bubbles while immersed in wastewater.
Figures 3, 4, 5:
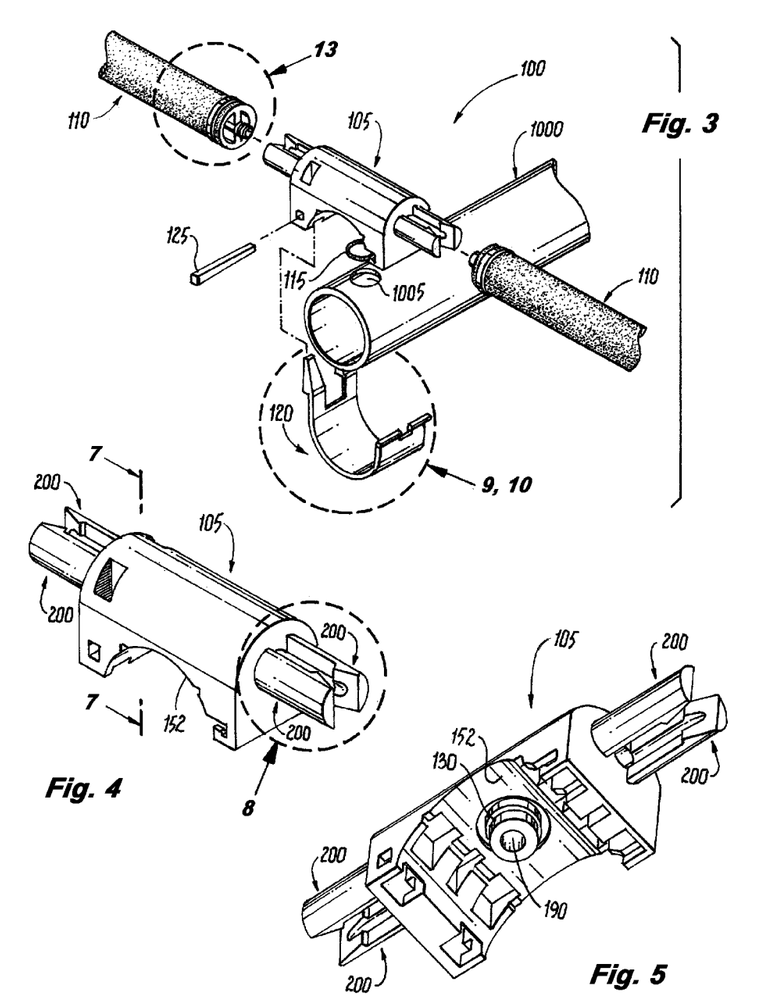
FIG. 3 shows an exploded perspective view of the FIG. 1 elements.
FIG. 4 shows a top perspective view of the saddle in FIG. 1.
FIG. 5 shows a bottom perspective view of the FIG. 4 saddle.

FIGS. 1-3 show aspects of an aeration assembly 100 (i.e., an apparatus) in accordance with an illustrative embodiment of the invention in association with an air distribution pipe 1000. FIG. 1 shows a perspective view of these elements in isolation, while FIG. 2 shows a perspective view of these elements functioning to create air bubbles 3000 while immersed in wastewater 4000. FIG. 3 shows an exploded perspective view of the aeration assembly 100 and the air distribution pipe 1000.

The aeration assembly 100 comprises a saddle 105 and two tube diffusers 110. The saddle 105 is fixated to a top of the air distribution pipe 1000 via a gasket 115, a band 120, and a wedge 125. With the saddle 105 positioned atop the air distribution pipe 1000, the saddle 105 penetrates an air distribution pipe hole 1005 in the air distribution pipe 1000, allowing the saddle 105 to access an interior of the air distribution pipe 1000. The saddle 105 is thereby placed into gaseous communication with the interior of the air distribution pipe 1000.

The two tube diffusers 110 are attached to the saddle 105 on opposite sides of the saddle 105 so that the two tube diffusers 110 are oriented transverse to the air distribution pipe 1000. With the two tube diffusers 110 attached to the saddle 105, each of the two tube diffusers 110 is also placed into gaseous communication with the interior of the air distribution pipe 1000 via internal plumbing in the saddle 105. So arranged, air from the air distribution pipe 1000 may be routed to the two tube diffusers 110 so as to ultimately cause the two tube diffusers 110 to emit a plume of the air bubbles 3000 into the wastewater 4000 in the manner shown in FIG. 2.

Figures 6, 7, 8, 9, 10:
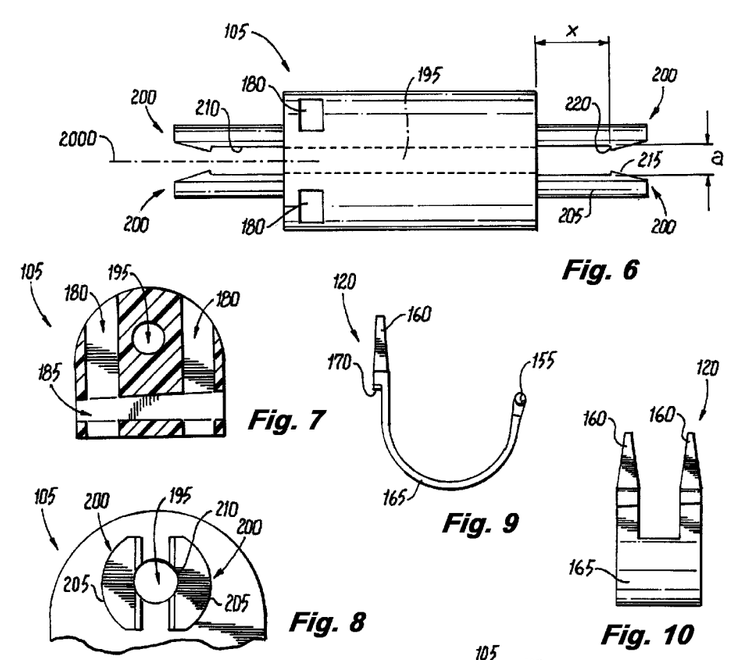
FIG. 6 shows a top elevational view of the FIG. 4 saddle.
FIG. 7 shows a sectional view of the FIG. 4 saddle.
FIG. 8 shows an end elevational view of the FIG. 4 saddle.
FIG. 9 shows a side elevational view of the band in FIG. 1.
FIG. 10 shows a front elevational view of the FIG. 9 band.
Figure 11:
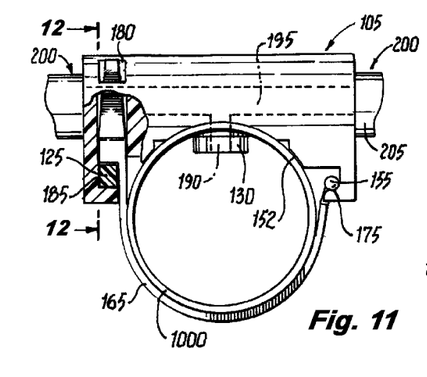
FIG. 11 shows a partially broken, side elevational view of the saddle, the band, the wedge, and the air distribution pipe in FIG. 1.
Figure 12:
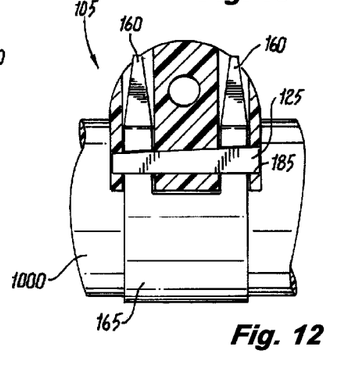
FIG. 12 shows a sectional view of the FIG. 11 elements.

FIGS. 4-12 show aspects of the saddle 105, the band 120, the wedge 125, and the air distribution pipe 1000, as well as the manner in which these various elements cooperate. FIG. 4 shows a top perspective view of the saddle 105, and FIG. 5 shows a bottom perspective view of the saddle 105. FIG. 6 shows a top elevational view of the saddle 105, FIG. 7 shows a sectional view of the saddle 105 along the cleave plane indicated in FIG. 4, and FIG. 8 shows an end elevational view of the saddle 105. FIG. 9 shows a side elevational view of the band 120, while FIG. 10 shows a front elevational view of the band 120. FIG. 11 shows a partially broken, side elevational view of the saddle 105, the band 120, the wedge 125, and the air distribution pipe 1000. Finally, FIG. 12 shows a sectional view of the saddle 105, the band 120, the wedge 125, and the air distribution pipe 1000 along the cleave plane indicated in FIG. 11. The gasket 115 would also be in place between the saddle 105 and the air distribution pipe 1000 in the apparatus shown in FIGS. 11 and 12, but is not visible in these particular figures.

The saddle 105 defines a curved lower portion 152, which is shaped to conform to the top of the air distribution pipe 1000, and a saddle nipple 130, which protrudes beneath the saddle 105 and penetrates the air distribution pipe hole 1005 in the air distribution pipe 1000. As indicated above, fixation of the saddle 105 to the air distribution pipe 1000 is via the gasket 115, the band 120, and the wedge 125. The band 120 is hook-shaped with two cylindrical portions 155 at one end, two pointed portions 160 at the other end, and a curved portion 165 spanning therebetween. Each of the two pointed portions 160 is raised slightly from the remainder of the band 120 to create two ridges 170 in the band 120. To accomplish the fixation, the two cylindrical portions 155 of the band 120 occupy rounded slots 175 in the saddle 105, the two pointed portions 160 occupy vertical slots 180 in the saddle 105, and the curved portion 165 surrounds the air distribution pipe 1000. The wedge 125 passes through a horizontal slot 185 in the saddle 105 and engages the two ridges 170 of the band 120 to hold the band 120 in place.

Internally, the saddle 105 further defines two passages: a saddle internal vertical channel 190 and a saddle internal horizontal channel 195. The saddle internal vertical channel 190 is partially disposed within the saddle nipple 130 and forms part of the saddle nipple 130. That is, the saddle nipple 130 encloses a portion of the saddle internal vertical channel 190. The saddle internal horizontal channel 195 merges with the saddle internal vertical channel 190 and runs transverse thereto to opposite sides of the saddle 105. The saddle internal horizontal channel 195 is centered about a longitudinal axis 2000 (FIG. 6). At each point on the saddle 105 where the saddle internal horizontal channel 195 emerges, the saddle 105 defines a respective pair of engagement arms 200 (resulting in two pairs of engagement arms 200 or four engagement arms 200 in total). Each engagement arm 200 projects from the saddle 105 parallel to the longitudinal axis 2000. Each engagement arm 200 within a given pair of engagement arms 200 is essentially the mirror image of the other. Each engagement arm 200 is curved on one side so as to define a respective semi-cylindrical surface 205. Proximal to the saddle 105, the other side of each of the engagement arms 200 is mostly flat with a respective curved concave slot 210 that is indexed to and continuous with the saddle internal horizontal channel 195 of the saddle 105. Distal to the saddle 105, each engagement arm 200 defines a respective ramp-shaped portion 215. Each ramp-shaped portion 215 defines a respective raised step 220 where it meets the remainder of the engagement arm 200.

Figure 13:
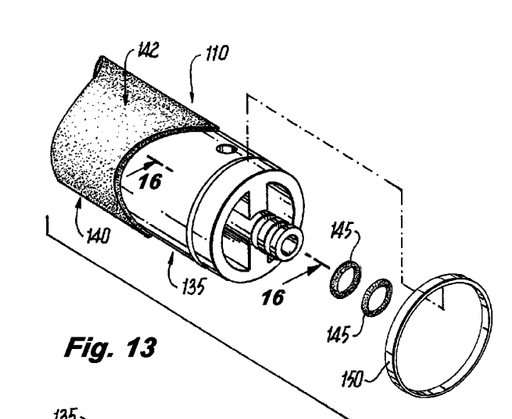
FIG. 13 shows an exploded perspective view of a tube diffuser in FIG. 1.
Figure 14:
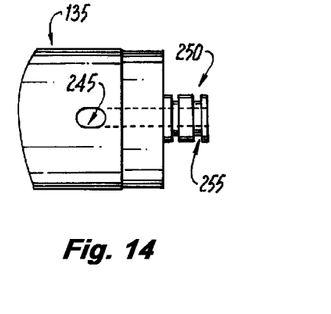
FIG. 14 shows a top elevational view of a diffuser body in FIG. 1.
Figure 15:
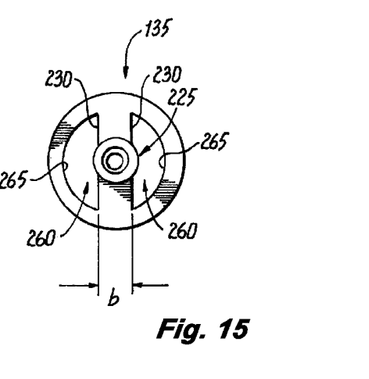
FIG. 15 shows a front perspective view of the FIG. 14 diffuser body.
Figure 16:
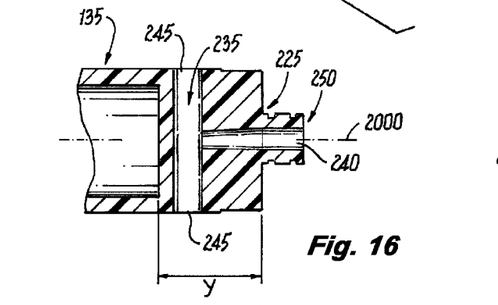
FIG. 16 shows a sectional view of the FIG. 14 diffuser body.

FIGS. 13-16 set forth additional aspects of a representative one of the two tube diffusers 110, which comprises a respective diffuser body 135, a respective diffuser membrane 140, a respective set of o-rings 145, and a respective pair of clamps 150. FIG. 13 shows an exploded perspective view of the tube diffuser 110, while FIG. 14 shows a top elevational view of the diffuser body 135. FIG. 15 shows a front perspective view of the diffuser body 135, and FIG. 16 shows a sectional view of the diffuser body 135 along the cleave plane indicated in FIG. 13.

The diffuser body 135 is externally cylindrical. Internally, the diffuser body 135 defines a gas distribution section 225, which spans across an interior diameter of the diffuser body 135 at a proximal end thereof. The gas distribution section 225 defines two oppositely-facing external sidewalls 230 as well as two internal channels: a diffuser internal vertical channel 235 and a diffuser internal horizontal channel 240. The diffuser internal vertical channel 235 runs transverse to the longitudinal axis 2000 and terminates in diffuser holes 245 in the diffuser body 135. The diffuser internal horizontal channel 240 terminates in a diffuser nipple 250, which protrudes from a proximal end of the diffuser body 135. In this manner, the diffuser nipple 250 encloses a portion of the diffuser internal horizontal channel 240. With the diffuser body 135 fixated to the saddle 105, the diffuser internal horizontal channel 240 and, correspondingly, the entire tube diffuser 110 are centered about the same longitudinal axis 2000 as the saddle internal horizontal channel 195 of the saddle 105 (FIGS. 6 and 16). The o-rings 145 fit into recessed slots 255 in the diffuser nipple 250.

Two open spaces 260 occupy opposite sides of the gas distribution section 225. Each of the two open spaces 260 is disposed between a respective one of the two oppositely-facing external sidewalls 230 and a curved internal sidewall 265 of the diffuser body 135. To aid with fixation (described below), the dimension marked b in FIG. 15 is substantially equal to the dimension marked $\alpha$ in FIG. 6, and the dimension marked y in FIG. 16 is substantially equal to the dimension marked x in FIG. 6

Other than the gas distribution sections 225, the diffuser body 135 is essentially hollow. This allows wastewater to fill the interior of the diffuser body 135 and reduce its buoyancy when immersed in the wastewater 4000. The reduced buoyancy places less strain on the saddle 105 and the air distribution pipe 1000 when deployed in a wastewater treatment tank.

The diffuser membrane 140, which is flexible and tubular, is attached to the outside of the diffuser body 135 via the clamps 150 so that the diffuser membrane 140 covers a portion of the diffuser body 135. The diffuser membrane 140 defines a plurality of membrane holes 142 therein, which are ultimately responsible for releasing the plume of air bubbles 3000 into the wastewater 4000.

Figure 17:
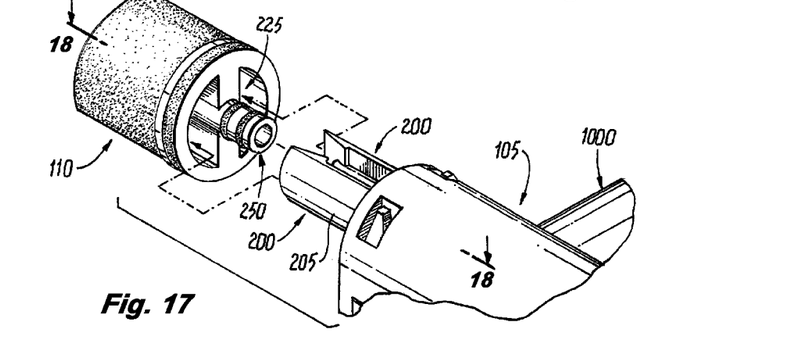
FIG. 17 shows a perspective view of the saddle and a tube diffuser in FIG. 1 just before fixation.
Figure 18:
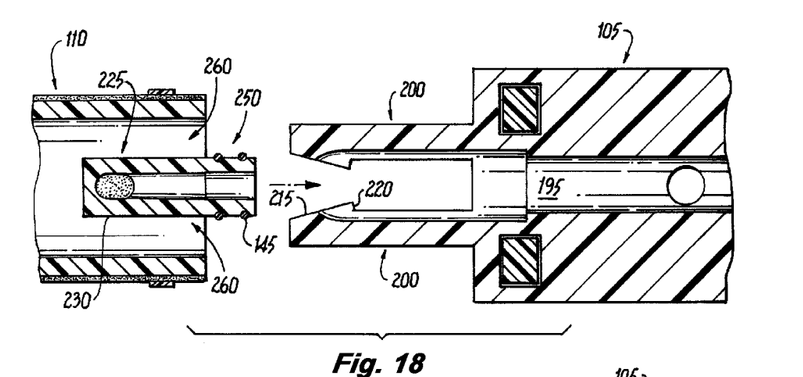
FIGS. 18-20 show a series of sectional views of the FIG. 17 elements just before, during, and after fixation, respectively.
Figure 19:
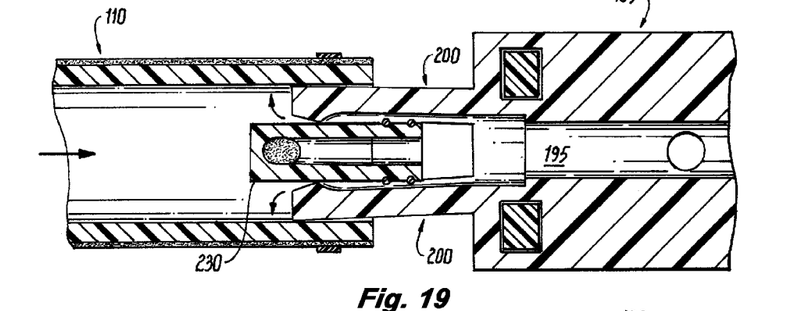
Figure 20:
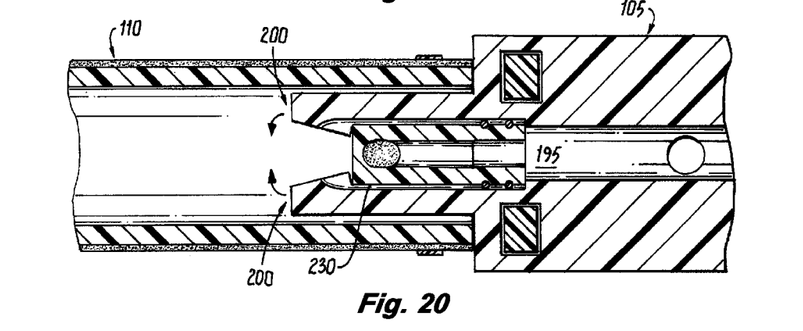

The diffuser body 135 is fixated to the saddle 105 via a cooperation between the diffuser nipple 250, the gas distribution section 225, the saddle internal horizontal channel 195, and a pair of the engagement arms 200. FIG. 17 shows a perspective view of the saddle 105 and the tube diffuser 110 just before fixation. FIGS. 18-20 show a series of sectional views of these two elements along the cleave plane indicated in FIG. 17 just before, during, and after fixation, respectively. To achieve fixation, the diffuser body 135 is slid onto the pair of engagement arms 200 while the diffuser nipple 250 engages the saddle internal horizontal channel 195. While doing so, the pair of engagement arms 200 enter the two open spaces 260 on opposite sides of the gas distribution section 225 of the diffuser body 135 and are made to bend away from each other by the contact between ramp-shaped portions 215 of the engagement arms 200 and the gas distribution section 225 (FIG. 19). Sliding the diffuser body 135 onto the engagement arms 200 continues until the diffuser nipple 250 fully engages the saddle internal horizontal channel 195 and the respective ramp-shaped portions 215 pass beyond the gas distribution section 225. At this point, the engagement arms 200 return to (i.e., snap to) their natural, un-splayed positions and the raised steps 220 of the engagement arms 200 engage the distal corners of the gas distribution section 225 (FIG. 20). In this manner, each of the engagement arms 200 occupies a respective one of the two open spaces 260 and abuts a respective one of the two oppositely-facing external sidewalls 230.

Accordingly, fixation between the saddle 105 and the tube diffuser 110 is accomplished by the unique engagement arms 200 on the saddle 105 coupling with the unique gas distribution section 225 found on the tube diffuser 110. Fixation in this manner is nearly permanent unless a long tool is used to access and again splay the locked engagement arms 200. The o-rings 145 ensure an airtight seal between the diffuser nipple 250 and the saddle internal horizontal channel 195 of the saddle 105.

Figure 21:
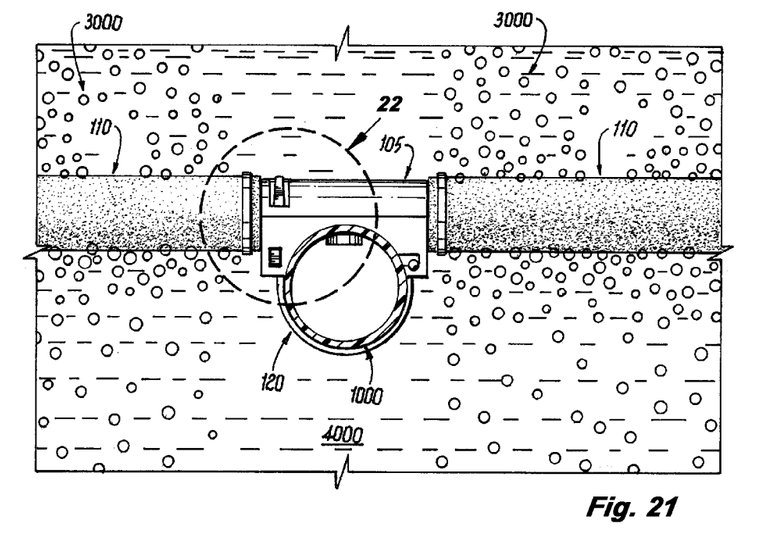
FIG. 21 shows a side elevational view of the FIG. 1 elements with these elements immersed in wastewater.
Figure 22:
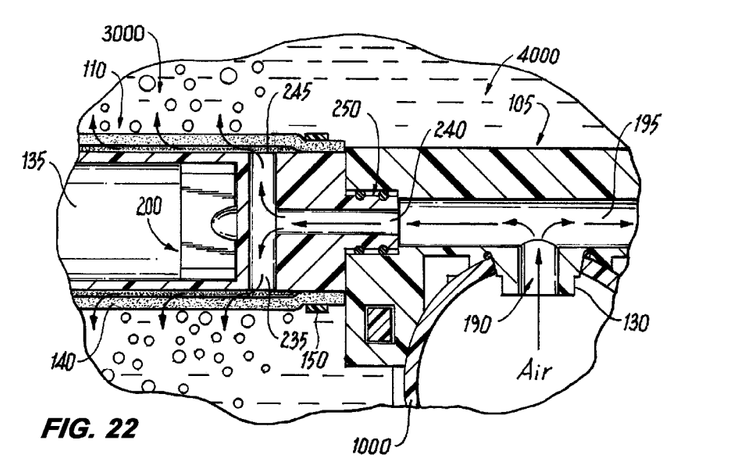
FIG. 22 shows a sectional view of the FIG. 21 elements.

With the aeration assembly 100 attached to the air distribution pipe 1000 in the manner indicated above, pressurized air may be supplied to the air distribution pipe 1000 to cause the two tube diffusers 110 to emit plumes of the air bubbles 3000 into the wastewater 4000. FIG. 21 shows a side elevational view of the saddle 105, the two tube diffusers 110, and the air distribution pipe 1000 with these elements immersed in the wastewater 4000, while FIG. 22 shows a sectional view through the center of the saddle 105 and a representative one of the two tube diffusers 110 in the region indicated in FIG. 21. Referring to FIG. 22, air enters the saddle 105 via the saddle nipple 130 and passes to the tube diffuser 110 via the saddle internal vertical channel 190, the saddle internal horizontal channel 195, and the diffuser nipple 250. Once inside the tube diffuser 110, the air is passed via the diffuser internal horizontal channel 240 and the diffuser internal vertical channel 235 to the diffuser holes 245 underlying the diffuser membrane 140. The air causes the diffuser membrane 140 to expand somewhat away from the underlying diffuser body 135 along the length of the diffuser membrane 140 between the clamps 150. The air then passes through the membrane holes 142 in the diffuser membrane 140 into the wastewater 4000. When the air supply is stopped, the diffuser membrane 140 again relaxes against the diffuser body 135, blocking the diffuser holes 245 and stopping water from penetrating backwards into the tube diffuser 110.

The aeration assembly 100 and, more generally, embodiments in accordance with aspects of the invention, provide several advantages over prior art designs. A saddle like the saddle 105 may be fixated to an air distribution pipe quickly and easily utilizing a band and wedge like the band 120 and the wedge 125 described above. A tube diffuser like the tube diffuser 110 may be attached to the saddle merely by sliding the tube diffuser onto the engagement arms of the saddle, requiring little more than "snapping" the two elements together. Such easy assembly dramatically reduces assembly labor and also reduces the chances of leaks and other defects in the resultant aeration system. The two tube diffusers 110 may be provided with their o-rings 145, their diffuser membranes 140, and their clamps 150 already in place so as to further reduce any assembly required in the field.

In addition, as another advantage, modeling suggests saddles and tube diffusers in accordance with aspects of the invention may be shipped in a very compact form by having the two elements occupy different containers or different volumes of the same container, substantially reducing resultant shipping costs. That is, the ease of assembly in the field facilitates having the saddles be shipped in one volume and the tube diffusers in another.

Tube diffuser assemblies in accordance with aspects of the invention may be utilized with air distribution pipes and tube diffusers of various diameters. In one or more exemplary embodiments, for example, an air distribution pipe with an inside diameter of about 4 inches (10 centimeters (cm)) and an outside diameter of about 4.5 (11 cm) inches may be utilized. Moreover, the diffuser bodies may have an outside diameter of, for example, about 2 inches (5 cm) and a length of about 40 inches (102 cm). Nonetheless, these dimensions are merely by way of illustration and many other suitable dimensions may be utilized.

Once understood from the description provided herein, the various above-described elements may be produced by conventional manufacturing techniques or sourced commercially. In one or more non-limiting, exemplary embodiments, the diffuser membrane 140, the o-rings 145, and the gasket 115 may be formed of ethylene propylene diene monomer (EPDM), the saddle 105 and the wedge 125 may be formed of acrylonitrile butadiene styrene (ABS), the band 120 may be formed of polyvinyl chloride (PVC), and the diffuser body 135 may be formed of polypropylene (PP). Here again, however, these choices of materials are merely by way of example.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. 112(f). In particular, the use of "steps of" in the claims herein is not intended to invoke the provisions of AIA 35 U.S.C. 112(f).

What is claimed is:

1. An apparatus comprising:
    a tube diffuser comprising:
        a diffuser body that is externally cylindrical, is centered about a longitudinal axis, and comprises:
            a curved internal sidewall;
            a gas distribution section spanning across an interior diameter of the diffuser body at a proximal end thereof and defining two oppositely-facing external sidewalls; and
            two open spaces, each of the two open spaces disposed between a respective one of the two oppositely-facing external sidewalls and the curved internal sidewall; and
        a diffuser membrane covering a portion of the diffuser body and defining a plurality of membrane holes.

2. The apparatus of claim 1, wherein the gas distribution section comprises:
    a diffuser internal horizontal channel centered about the longitudinal axis;
    a diffuser internal vertical channel running transverse to the longitudinal axis and merging with the diffuser internal horizontal channel; and
    a diffuser nipple protruding from the proximal end of the diffuser body and enclosing a portion of the diffuser internal horizontal channel.

3. The apparatus of claim 2, wherein the diffuser internal vertical channel terminates in a diffuser hole underlying the diffuser membrane.

4. The apparatus of claim 1, wherein the tube diffuser further comprises a pair of clamps fixating the diffuser membrane to the diffuser body.

5. The apparatus of claim 1, wherein the diffuser membrane is tubular and flexible.

6. The apparatus of claim 1, further comprising a saddle attached to the tube diffuser, the saddle comprising a pair of engagement arms, each engagement arm of the pair of engagement arms occupying a respective one of the two open spaces and abutting a respective one of the two oppositely-facing external sidewalls.

7. The apparatus of claim 6, wherein the saddle further comprises:
    a saddle internal horizontal channel centered about the longitudinal axis and engaging the gas distribution section;
    a saddle internal vertical channel running transverse to the longitudinal axis and merging with the saddle internal horizontal channel; and
    a saddle nipple protruding from a bottom of the saddle and enclosing a portion of the saddle internal vertical channel.

8. The apparatus of claim 6, wherein the saddle defines a curved lower portion shaped to conform to a top of an air distribution pipe.

9. The apparatus of claim 6, wherein each engagement arm of the pair of engagement arms projects from the saddle parallel to the longitudinal axis.

10. The apparatus of claim 6, wherein each engagement arm of the pair of engagement arms is a mirror image of the other.

11. The apparatus of claim 6, wherein each engagement arm of the pair of engagement arms is curved on one side so as to create a respective semi-cylindrical surface.

12. The apparatus of claim 6, wherein each engagement arm of the pair of engagement arms defines a respective ramp-shaped portion that defines a respective raised step.

13. The apparatus of claim 6, further comprising an air distribution pipe, wherein the saddle is attached to the air distribution pipe and is operative to transfer air from the air distribution pipe to the tube diffuser.

14. The apparatus of claim 13, further comprising wastewater, wherein the tube diffuser is operative to release air bubbles into the wastewater.

15. The apparatus of claim 13, further comprising a band fixating the saddle to the air distribution pipe.

* * * * *